US007185201B2

(12) United States Patent
Rhoads et al.

(10) Patent No.: US 7,185,201 B2
(45) Date of Patent: Feb. 27, 2007

(54) CONTENT IDENTIFIERS TRIGGERING CORRESPONDING RESPONSES

(75) Inventors: Geoffrey B. Rhoads, West Linn, OR (US); Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 398 days.

(21) Appl. No.: 09/858,189

(22) Filed: May 14, 2001

(65) Prior Publication Data

US 2002/0032864 A1     Mar. 14, 2002

Related U.S. Application Data

(63) Continuation-in-part of application No. 09/571,422, filed on May 15, 2000, now Pat. No. 6,947,571, which is a continuation-in-part of application No. 09/574,726, filed on May 18, 2000, and a continuation-in-part of application No. 09/552,998, filed on Apr. 19, 2000, and a continuation-in-part of application No. 09/547,664, filed on Apr. 12, 2000, and a continuation-in-part of application No. 09/543,125, filed on Apr. 6, 2000, and a continuation-in-part of application No. 09/531,076, filed on Mar. 18, 2000, and a continuation-in-part of application No. 09/476,686, filed on Dec. 30, 1999, and a continuation-in-part of application No. 09/342,688, filed on Jun. 29, 1999, now Pat. No. 6,650,761, and a continuation-in-part of application No. 09/342,689, filed on Jun. 29, 1999, now Pat. No. 6,311,214, and a continuation-in-part of application No. 09/342,971, filed on Jun. 29, 1999, and a continuation-in-part of application No. 09/343,101, filed on Jun. 29, 1999, and a continuation-in-part of application No. 09/343,104, filed on Jun. 29, 1999.

(60) Provisional application No. 60/141,468, filed on Jun. 29, 1999, provisional application No. 60/151,586, filed on Aug. 30, 1999, provisional application No. 60/158,015, filed on Oct. 6, 1999, provisional application No. 60/163,332, filed on Nov. 3, 1999, provisional application No. 60/164,619, filed on Nov. 10, 1999, provisional application No. 60/134,782, filed on May 19, 1999.

(51) Int. Cl.
*H04L 9/00* (2006.01)

(52) U.S. Cl. ........................ 713/176; 713/161

(58) Field of Classification Search ........ 713/160–161, 713/165, 176, 181, 189, 200–202, 186, 170; 380/200–205, 210, 217, 229, 236–239, 241, 380/54, 51; 705/51, 57–59, 67; 382/115–119, 382/124, 100; 704/200

See application file for complete search history.

(56) References Cited

U.S. PATENT DOCUMENTS

| | | | |
|---|---|---|---|
| 3,919,479 A | 11/1975 | Moon et al. | |
| 4,230,990 A | 10/1980 | Lert, Jr. et al. | |
| 5,486,686 A | 1/1996 | Zdybel, Jr. et al. | |
| 5,572,653 A | 11/1996 | DeTemple et al. | |
| 5,574,519 A | 11/1996 | Manico et al. | |
| 5,574,962 A | 11/1996 | Fardeau et al. | |
| 5,579,124 A | 11/1996 | Aijala et al. | |
| 5,581,800 A | 12/1996 | Fardeau et al. | |
| 5,584,070 A | 12/1996 | Harris et al. | |
| 5,659,726 A | 8/1997 | Sandford, II et al. | |
| 5,748,763 A | 5/1998 | Rhoads | |
| 5,768,426 A | 6/1998 | Rhoads | |
| 5,774,452 A | 6/1998 | Wolosewicz | |
| 5,774,666 A | 6/1998 | Portuesi | |
| 5,781,914 A | 7/1998 | Stork et al. | |
| 5,838,790 A * | 11/1998 | McAuliffe et al. | 713/176 |
| 5,918,223 A | 6/1999 | Blum et al. | |
| 5,938,727 A | 8/1999 | Ikeda | |
| 5,940,135 A | 8/1999 | Petrovic et al. | |
| 5,982,956 A | 11/1999 | Lahmi | |
| 5,986,651 A | 11/1999 | Reber et al. | |
| 5,995,751 A * | 11/1999 | Kosugi et al. | 717/100 |
| 6,005,501 A | 12/1999 | Wolosewicz | |
| 6,037,984 A | 3/2000 | Isnardi et al. | |
| 6,061,793 A | 5/2000 | Tewfik et al. | |
| 6,081,827 A | 6/2000 | Reber et al. | |
| 6,121,530 A | 9/2000 | Sonoda | |
| 6,233,684 B1 | 5/2001 | Stefik et al. | |
| 6,282,362 B1 | 8/2001 | Murphy et al. | |
| 6,282,654 B1 | 8/2001 | Ikeda et al. | |
| 6,311,214 B1 | 10/2001 | Rhoads | |

(Continued)

FOREIGN PATENT DOCUMENTS

| | | |
|---|---|---|
| EP | 0967803 | 12/1999 |
| EP | 1173001 | 1/2002 |
| WO | WO96/26494 | 8/1996 |
| WO | WO00/79709 | 12/2000 |
| WO | WO0106703 | 1/2001 |
| WO | WO0115021 | 3/2001 |
| WO | WO02/03385 | 1/2002 |
| WO | WO0211123 | 2/2002 |
| WO | WO0227600 | 4/2002 |

OTHER PUBLICATIONS

Cognicity, Inc. Initial Offer in Response to Secure Digital Music Initiative CfP for Phase II Screening Technology submission 2, Apr. 24, 2000.

Cognicity's Response to Secure Digital Music Initiative CfP for Phase II Screening Technology, Submission 2, Jun. 18, 2000.

(Continued)

Primary Examiner—Hosuk Song
(74) Attorney, Agent, or Firm—Digimarc Corporation

(57) ABSTRACT

Fingerprint data derived from audio or other content is used as an identifier, to trigger machine responses corresponding to the content. The fingerprint can be derived from the content, and also separately encoded in a file header. Digital watermarks can also be similarly used.

20 Claims, No Drawings

U.S. PATENT DOCUMENTS

| | | |
|---|---|---|
| 6,351,815 B1 | 2/2002 | Adams |
| 6,389,055 B1 | 5/2002 | August et al. |
| 6,421,450 B2 | 7/2002 | Nakano |
| 6,425,081 B1 * | 7/2002 | Iwamura .................. 713/176 |
| 6,437,933 B1 | 8/2002 | Sugiyama et al. |
| 6,505,160 B1 | 1/2003 | Levy et al. |
| 6,590,998 B2 | 7/2003 | Rhoads |
| 6,614,914 B1 | 9/2003 | Rhoads et al. |
| 6,650,761 B1 | 11/2003 | Rodriguez et al. |
| 6,681,028 B2 | 1/2004 | Rodriguez et al. |
| 6,704,432 B2 | 3/2004 | Eversole et al. |
| 6,807,285 B1 | 10/2004 | Iwamura |
| 6,834,308 B1 | 12/2004 | Ikezoye et al. |
| 6,931,451 B1 | 8/2005 | Logan et al. |
| 6,941,275 B1 | 9/2005 | Swierczek |
| 6,947,571 B1 | 9/2005 | Rhoads et al. |
| 6,970,886 B1 | 11/2005 | Conwell et al. |
| 6,973,669 B2 | 12/2005 | Daniels |
| 6,987,862 B2 | 1/2006 | Rhoads |
| 2001/0021144 A1 | 9/2001 | Oshima et al. |
| 2001/0026618 A1 | 10/2001 | Van Wie et al. |
| 2001/0032312 A1 | 10/2001 | Runje et al. |
| 2001/0055391 A1 | 12/2001 | Jacobs |
| 2002/0010826 A1 | 1/2002 | Takahashi et al. |
| 2002/0016915 A1 | 2/2002 | Kumazawa et al. |
| 2002/0023020 A1 | 2/2002 | Kenyon et al. |
| 2002/0030907 A1 | 3/2002 | Ikeda et al. |
| 2002/0032698 A1 | 3/2002 | Cox et al. |
| 2002/0036800 A1 | 3/2002 | Nozaki et al. |
| 2002/0049580 A1 | 4/2002 | Kutaragi et al. |
| 2002/0059522 A1 | 5/2002 | Hirano et al. |
| 2002/0059580 A1 | 5/2002 | Kalker et al. |
| 2002/0085737 A1 | 7/2002 | Kitamura |
| 2002/0107803 A1 | 8/2002 | Lisanke et al. |
| 2002/0126872 A1 | 9/2002 | Brunk et al. |
| 2003/0011684 A1 | 1/2003 | Narayanaswami et al. |
| 2003/0076955 A1 | 4/2003 | Alve et al. |
| 2003/0167173 A1 | 9/2003 | Levy et al. |
| 2003/0174861 A1 | 9/2003 | Levy et al. |
| 2005/0013462 A1 | 1/2005 | Rhoads |

OTHER PUBLICATIONS

Cognicity's Phase II Screening Technology: Non Watermarking Solution, Powerpoint presentation, Jun. 26, 2000.

"Access Control and COpyright Protection for Images, WorkPackage 1: Access Control and Copyright Protection for Images Need Evaluation," Jun., 1995, 21 pages.

Bender et al., "Applications for Data Hiding," IBM Systems Journal, vol. 39, Nos. 3&4, 2000, pp. 547-568.

Bender et al, "Techniques for Data Hiding," Draft Preprint, Private Correspondence, dated Oct. 30, 1995.

Quisquater et al., "Access Control and COpyright Protection for Images, Conditional Access and Copyright Protection Based on the Use of Trusted Third Parties," 1995, 43 pages.

Lee, "Fingerprinting" in *Information Hiding Techniques for Steganography and Digital Watermarking,* Boston, MA, Artech House, 2000.

Ghias et al, Query by Humming: Musical Information Retrieval In An Audio Database, In ACM Multimedia, pp. 231-236, Nov., 1995.

Kageyama et al, Melody Retrieval with Humming, Proceedings of Int. Computer Music Conference (ICMC), 1993.

Muscle Fish press release, Music Fish's Audio Search Technology to be Encapsulated into Informix Datablade Module, Jul. 10, 1996.

Wold et al, Content-Based Classification, Search, and Retrieval of Audio, IEEE Multimedia Magazine, Fall, 1996.

* cited by examiner

US 7,185,201 B2

CONTENT IDENTIFIERS TRIGGERING CORRESPONDING RESPONSES

RELATED APPLICATION DATA

This application is a continuation-in-part of application Ser. No. 09/571,422, filed May 15, 2000 (now U.S Pat. No. 6,947,571). Application Ser. No. 09/571,422 claims priority benefit to each of the following provisional applications: 60/141,468, filed Jun. 29, 1999 ; 60/151,586, filed Aug. 30, 1999; 60/158,015, filed Oct. 6, 1999; 60/163,332, filed Nov. 3, 1999; and 60/164,619, filed Nov. 10, 1999. Application Ser. No. 09/571,422 is also a continuation-in-part of each of the following utility applications: Ser. No. 09/314,648, filed May 19, 1999(now Pat. No. 6,681,028); 09/342,688, filed Jun. 29, 1999 (now Pat. No. 6,650,761); 09/342,689, filed Jun. 29, 1999 (now Pat. No. 6,311,214); 09/342,971, filed Jun. 29, 1999(published as US 20030040957, now abandoned); 09/343,101, filed Jun. 29, 1999(now abandoned); 09/343,104, filed Jun. 29, 1999(now abandoned); 09/531,076, filed Mar. 18, 2000; Ser. No. 09/543,125, filed Apr. 6, 2000(now Pat. No. 7,143,949); 09/547,664, filed Apr. 12, 2000; and Ser. No. 09/552,998, filed Apr. 19, 2000 (now abandoned).

This application is also a continuation-in-part of copending application Ser. Nos. 09/574,726,filed May 18, 2000, and 09/476,686, filed Dec. 30, 1999, both of which claim priority to application 60/134,782, filed May 19, 1999.

The present application claims priority benefit to the foregoing applications.

The subject matter of this application is also related to that of Ser. No. 09/620,019, 60/257,822, 60/232,163, and 09/404,291.

FIELD OF THE INVENTION

The present invention relates to computer-based systems, and more particularly relates to systems that identify electronic or physical objects (e.g., audio, printed documents, video, etc.), and trigger corresponding responses.

BACKGROUND

In application Ser. No. 09/571,422 (now laid-open as PCT publication WO 00/70585), the present assignee described technology that can sense an object identifier from a physical or electronic object, and trigger a corresponding computer response.

In application Ser. Nos. 09/574,726 and 09/476,686, the present assignee described technology that uses a microphone to sense audio sounds, determine an identifier corresponding to the audio, and then trigger a corresponding response.

DETAILED DESCRIPTION

Although the cited patent applications focused on use of digital watermarks to identify the subject objects/audio, they noted that the same applications and benefits can be provided with other identification technologies.

One such suitable technology—variously known as robust hashing, fingerprinting, etc.—involves generating an identifier from attributes of the content. This identifier can then be looked-up in a database (or other data structure) to determine the song (or other audio track) to which it corresponds.

Various fingerprinting technologies are known. For example, a software program called TRM, from Relatable Software, was written up in the Washington Post as follows:

TRM performs a small technological miracle: It "fingerprints" songs, analyzing beat and tempo to generate a unique digital identifier. Since every song is slightly different, no two "acoustic fingerprints" are alike, not even live and studio versions of the same melody.

Tuneprint is another such audio fingerprinting tool. Tuneprint is understood to utilize a model of human hearing used to predict how audio will appear after it's been distorted by the human ear, and the parts of neural processing that are understood. This is some of the same information that led to MP3 encoders achieving exceptional audio compression. Characteristics that uniquely identify the track are then identified by picking out the most important, surprising, or significant features of the sound.

Yet another fingerprinting program is Songprint, available as an open source library from freetantrum.org.

One form of fingerprint may be derived by applying content—in whole or part, and represented in time—or frequency format—to a neural network, such as a Kohonen self-organizing map. For example, a song may be identified by feeding the first 30 seconds of audio, with 20 millisecond fourier transformed windows, into a Kohonen network having 64 outputs. The 64 outputs can, themselves, form the fingerprint, or they can be further processed to yield the fingerprint.

A variety of other fingerprinting tools and techniques are known to artisans in the field. Others are disclosed, e.g., in applications 60/257,822, Ser. No. 09/563,664 (now U.S. Pat. No. 6,505,160), and Ser. No. 09/578,551. See also the chapter on Fingerprinting by John Hyeon Lee, in *Information Hiding: Techniques for Steganography and Digital Watermarking* edited by Stefan Katzenbeisse and Fabien A. P. Petitcolas, published by Artech House.

One way to generate a fingerprint is to "hash" the audio, to derive a shorter code that is dependent, in a predetermined way, on the audio data. However, slight differences in the audio data (such as sampling rate) can cause two versions of the same song to yield two different hash codes. While this outcome is advantageous in certain outcomes, it is disadvantageous in many others.

Generally preferable are audio fingerprinting techniques that yield the same fingerprints, even if the audio data are slightly different. Thus, a song sampled at a 96K bitrate desirably should yield the same fingerprint as the same song sampled at 128K. Likewise, a song embedded with steganographic watermark data should generally yield the same fingerprint as the same song without embedded watermark data.

One way to do this is to employ a hash function that is insensitive to certain changes in the input data. Thus, two audio tracks that are acoustically similar will hash to the same code, notwithstanding the fact that individual bits are different. A variety of such hashing techniques are known.

Another approach does not rely on "hashing" of the audio data bits. Instead, the audio is decomposed into elements having greater or lesser perceptibility. Audio compression techniques employ such decomposition methods, and discard the elements that are essentially imperceptible. In fingerprinting, these elements can also be disregarded, and the "fingerprint" taken from the acoustically significant portions of the audio (e.g., the most significant coefficients after transformation of the audio into a transform domain, such as DCT).

Some fingerprinting techniques do not rely on the absolute audio data (or transformed data) per se, but rather rely on the changes in such data from sample to sample (or coefficient to coefficient) as an identifying hallmark of the audio.

Some fingerprinting algorithms consider the entire audio track (e.g., 3 minutes). Others work on much shorter windows—a few seconds, or fractions of seconds. The former technique yields a single fingerprint for the track. The latter yields plural fingerprints—one from each excerpt. (The latter fingerprints can be concatenated, or otherwise combined, to yield a master fingerprint for the entire audio track.) For compressed audio, one convenient unit from which excerpts can be formed is the frame or window used in the compression algorithm (e.g., the excerpt can be one frame, five frames, etc.).

One advantage to the excerpt-based techniques is that a song can be correctly identified even if it is truncated. Moreover, the technique is well suited for use with streaming media (in which the entire song data is typically not available all at once as a single file).

In database look-up systems employing fingerprints from short excerpts, a first fingerprint may be found to match 10 songs. To resolve this ambiguity, subsequent excerpt-fingerprints can be checked.

One way of making fingerprints "robust" against variations among similar tracks is to employ probabilistic methods using excerpt-based fingerprints. Consider the following, over-simplified, example:

| Fingerprinted excerpt | Matches these songs in database |
|---|---|
| Fingerprint 1 | A, B, C |
| Fingerprint 2 | C, D, E |
| Fingerprint 3 | B, D, F |
| Fingerprint 4 | B, F, G |

In this situation, it appears most probable that the fingerprints correspond to song B, since three of the four excerpt-fingerprints support such a conclusion. (Note that one of the excerpts—that which yielded Fingerprint 2—does not match song B at all.)

More sophisticated probabilistic techniques, of course, can be used.

Once a song has been identified in a database, a number of different responses can be triggered. One is to impose a set of usage controls corresponding to terms set by the copyright holder (e.g., play control limitations, record control, fee charges, etc.) Another is to identify metadata related to the song, and provide the metadata to a user (or a link to the metadata). In some such applications, the song is simply identified by title and artist, and this information is returned to the user, e.g., by email, instant messaging, etc. With this information, the user can be given an option to purchase the music in CD or electronic form, purchase related materials (t-shirts, concert tickets), etc. A great variety of other content-triggered actions are disclosed in the cited applications.

One of the advantages of fingerprint-based content identification systems is that they do not require any alteration to the content. Thus, recordings made 50 years ago can be fingerprinted, and identified through such techniques.

Going forward, there are various advantages to encoding the content with the fingerprint. Thus, for example, a fingerprint identifier derived from a song can be stored in a file header of a file containing that song. (MP3 files, MPEG files, and most other common content file formats include header fields in which such information can readily be stored.) The fingerprint can then obtained in two different ways—by reading the header info, and by computation from the audio information. This redundancy offers several advantages. One aids security. If a file has a header-stored fingerprint that does not match a fingerprint derived from the file contents, something is amiss—the file may be destructive (e.g., a bomb or virus), or the file structure may mis-identify the file contents.

In some embodiments, the fingerprint data (or watermark data) stored in the header may be encrypted, and/or authenticated by a digital signature such as a complete hash, or a few check bits or CRC bits. In such cases, the header data can be the primary source of the fingerprint (watermark) information, with the file contents being processed to re-derive the fingerprint (watermark) only if authentication of the fingerprint stored in the header fails. Instead of including the fingerprint in the header, the header can include an electronic address or pointer data indicating another location (e.g., a URL or database record) at which the fingerprint data is stored. Again, this information may be secured using known techniques.

Similarly, the fingerprint can point to a database that contains one or more IDs that are added via a watermark. This is useful when CDs are being converted to MP3 files (i.e. ripped) and the fingerprint is calculated from a hash of the table of contents (TOC) such as done with CDDB.com, or from all of the songs. In this case, the database entry for that fingerprint could include a list of IDs for each song, and these IDs are added via a watermark and/or frame header data. This can also be useful where the content is identified based upon a group of fingerprints from plural excerpts, in which case the database that determines the content also contains an identifier, unrelated to the fingerprint(s) for that piece of content that can be embedded via a watermark.

Instead of, or in addition to, storing a fingerprint in a file header, the fingerprint data may be steganographically encoded into the file contents itself, using known watermarking techniques (e.g., those disclosed in application Ser. No. 09/503,881 (now U.S. Pat. No. 6,614,914) and U.S. Pat. Nos. 6,061,793, 6,005,501 and 5,940,135). For example, the fingerprint ID can be duplicated in the data embedded via a watermark.

In some arrangements, a watermark can convey a fingerprint, and auxiliary data as well. The file header can also convey the fingerprint, and the auxiliary data. And even if the file contents are separated from the header, and the watermark is corrupted or otherwise lost, the fingerprint can still be recovered from the content. In some cases, the lost auxiliary data can alternatively be obtained from information in a database record identified by the fingerprint (e.g., the auxiliary information can be literally stored in the record, or the record can point to another source where the information is stored).

Instead of especially processing a content file for the purpose of encoding fingerprint data, this action can be done automatically each time certain applications process the content for other purposes. For example, a rendering application (such as an MP3 player or MPEG viewer), a compression program, an operating system file management program, or other-purposed software, can calculate the fingerprint from the content, and encode the content with that information (e.g., using header data, or digital watermarking). It does this while the file is being processed for another purpose, e.g., taking advantage of the file's copying into a processing system's RAM memory, from slower storage.

In formats in which content is segregated into portions, such as MP3 frames, a fingerprint can be calculated for, and encoded in association with, each portion. Such fingerprints can later be cross-checked against fingerprint data calculated from the content information, e.g., to confirm delivery of paid-for content. Such fingerprints may be encrypted and locked to the content, as contemplated in application Ser. No. 09/620,019.

In addition, in such frame based systems, the fingerprint data and/or watermark data can be embedded with some or all data throughout each frames. This way a streaming system can use the header to first check the song for identification, and if that identification is absent or not authenticated, the system can check for the watermark and/or calculate the fingerprint. This improves the efficiency and cost of the detecting system.

Before being encrypted and digitally signed, the data in the frame header can be modified by the content, possibly a hash of the content or a few critical bits of content. Thus, the frame header data cannot be transferred between content. When reading the data, it must be modified by the inverse transform of the earlier modification. This system can be applied whether the data is embedded throughout each frame or all in a global file header and is discussed in application Ser. No. 09/404,291 entitled "Method And Apparatus For Robust Embedded Data" by Ken Levy on Sep. 23, 1999. Reading this secure header data is only slightly more complex than without the modification, such that the system is more efficient than always having to calculate the fingerprint and/or detect the watermark.

To provide a comprehensive disclosure without unduly lengthening this specification, applicants incorporate by reference the patents and patent applications cited above. It is applicant's express intention to teach that the methods detailed herein are applicable in connection with the technologies and applications detailed in these cited patents and applications.

Although the foregoing specification has focused on audio applications, it will be recognized that the same principles are likewise applicable with other forms of content, including still imagery, motion pictures, video, etc. Thus, for example, Digimarc MediaBridge linking from objects to corresponding internet resources can be based on identifiers derived from captured image data or the like, rather than from embedded watermarks. As such, the technique is applicable to images and video.

We claim:

1. A method comprising:
    obtaining fingerprint data from a file header associated with a file, the fingerprint data being associated with contents of the file;
    checking the integrity of the fingerprint data;
    if the check leaves doubt about the fingerprint data thus obtained, then recalculating fingerprint data from contents of the file; and
    transmitting the fingerprint data to a database.

2. The method of claim 1 that includes:
    accessing a database record corresponding to the transmitted fingerprint data, to obtain associated information; and
    returning at least some of said associated information to a computer device from which the fingerprint data was transmitted.

3. The method of claim 1 in which the file contents comprise audio.

4. The method of claim 1 in which checking includes checking a digital signature.

5. The method of claim 1 in which the checking includes decrypting fingerprint data from the header and authenticating the decrypted data.

6. The method of claim 5 that includes applying an inverse modification to the fingerprint in the header prior to said decrypting.

7. The method of claim 1 that includes applying an inverse modification to the fingerprint in the header.

8. A method comprising:
    obtaining watermark data from a file header associated with a file, the watermark data being associated with contents of the file;
    checking the integrity of the watermark data;
    if the check leaves doubt about the watermark data thus obtained, then detecting watermark data from contents of the file; and
    transmitting the watermark data to a database.

9. The method of claim 8 that includes:
    accessing a database record corresponding to the transmitted watermark data, to obtain associated information; and
    returning at least some of said associated information to a computer device from which the watermark data was transmitted.

10. The method of claim 8 in which the file contents comprise audio.

11. The method of claim 8 in which checking includes checking a digital signature.

12. The method of claim 8 in which the checking includes decrypting watermark data from the header and authenticating the decrypted data.

13. The method of claim 12 that includes applying an inverse modification to the watermark in the header prior to said decrypting.

14. The method of claim 12 that includes applying an inverse modification to the watermark in the header.

15. A method comprising:
    (a) obtaining identifier data by reference to first data conveyed with a file;
    (b) if there is cause to doubt the identifier data thereby obtained, then deriving identifier data from contents of the file by application of an algorithm thereto; and
    (c) taking action based on said derived identifier.

16. The method of claim 15 in which act (a) comprises:
    reading first data conveyed in a header of said file;
    by reference to said first data, consulting a remote repository to obtain identifier data corresponding to said first data.

17. The method of claim 15 in which act (c) comprises transmitting the derived identifier to a remote database.

18. The method of claim 15 in which act (b) comprises authenticating the first data.

19. The method of claim 18 in which said authenticating proceeds with reference to a hash.

20. The method of claim 18 in which the authenticating proceeds with reference to CRC bits.

* * * * *